A. D. & W. H. WESTMAN & J. N. RICHARDS.
CHILD'S VEHICLE RUNNER.
APPLICATION FILED FEB. 5, 1912.

1,034,749.

Patented Aug. 6, 1912.

Witnesses
J. S. Edmunds
E. Bedford

Inventors
Alfred D. Westman,
William H. Westman and
James N. Richards
By P. J. Edmunds, attorney

UNITED STATES PATENT OFFICE.

ALFRED D. WESTMAN, WILLIAM H. WESTMAN, AND JAMES N. RICHARDS, OF CHATHAM, ONTARIO, CANADA.

CHILD'S-VEHICLE RUNNER.

1,034,749.     Specification of Letters Patent.    Patented Aug. 6, 1912.

Application filed February 5, 1912. Serial No. 675,904.

*To all whom it may concern:*

Be it known that we, ALFRED D. WESTMAN, WILLIAM H. WESTMAN, and JAMES N. RICHARDS, all subjects of the King of Great Britain, and all residents of the city of Chatham, in the county of Kent, in the Province of Ontario, Canada, have jointly invented a new and useful Child's-Vehicle Runner, of which the following is a full, clear, and exact description, such as will enable others skilled in the art to which it appertains to make and use the same.

This invention relates to runners for wheels, whereby the same are adapted for traveling in snow.

Among the objects of this invention is to provide an inexpensive and serviceable runner, which is light, strong and durable, and which can readily, easily and quickly be applied to the wheels and removed therefrom, when the snow disappears during the journey.

Other objects and advantages of the invention will hereinafter appear, and the novel features thereof will be particularly pointed out.

Figure 1:
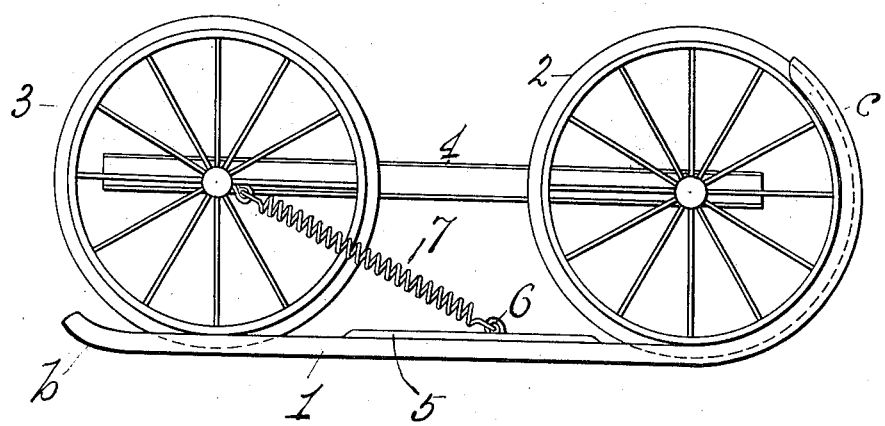
Figure 2:
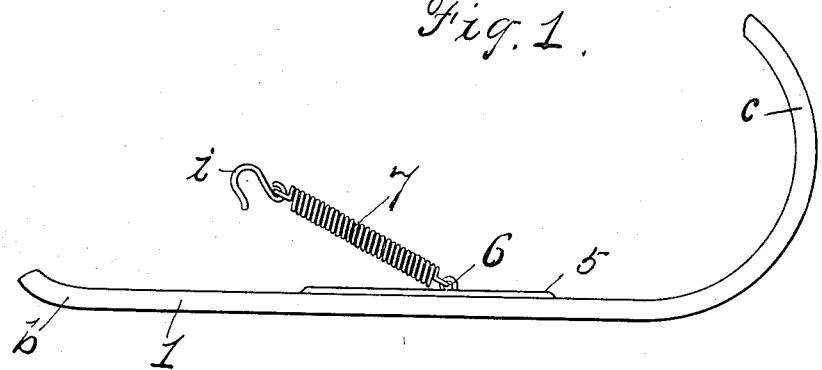
Figure 3:
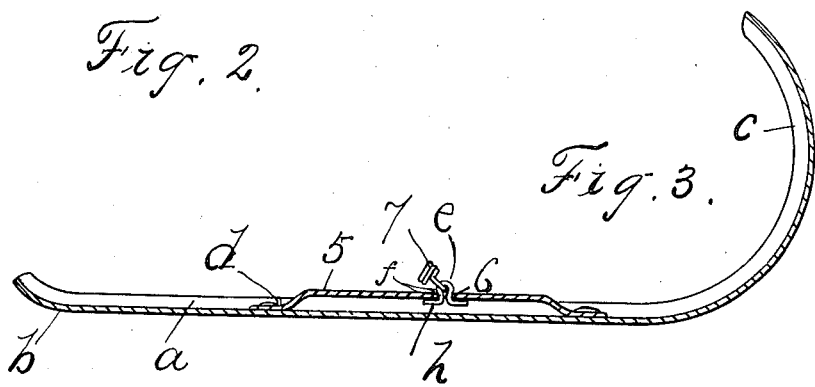
Figure 4:
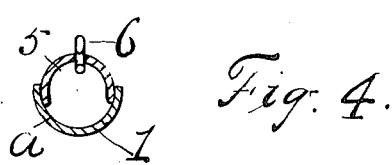

Referring to the accompanying drawings forming part of this description, wherein similar letters of reference indicate corresponding parts, Figure 1 represents a side elevation of a pair of wheels each provided with a runner constructed in accordance with this invention. Fig. 2 is a detail side view of the runner. Fig. 3 is a detail central longitudinal sectional view of same, in which part of the attachment to the runner is shown. Fig. 4 is a cross sectional view of the runner and semicircular plate.

In the accompanying drawings, 1 designates a runner preferably formed of metal but it may be formed of other suitable material as desired, in this runner 1 a longitudinal groove, a, is formed to give it a massive appearance at the same time form it light, strong and durable. The runner 1 is turned up slightly for a short distance at the rear end, as shown at, b, and it is turned up at the front end past the center as shown at, c, for the purpose of tightly grasping the front wheel.

2 designates the front wheels and 3 the rear wheels of a baby carriage or the like, and these front and rear wheels are connected together and one to the other by any suitable gearing 4.

5 designates a semicircular longitudinal plate, which is riveted by the rivets, d, or other suitable securing means, to the runner 1 as shown particularly in Figs. 3 and 4.

6 designates a cotter pin which is bent over on itself and formed with the loop, e, which looped portion, e, of said cotter pin 6 extends partly through the hole, f, in said semicircular plate 5, and is secured to said semicircular plate 5 by turning up the ends, h, of said cotter pin 6 at right angles thereto as shown in Fig. 3.

7 designates a coil spring one end of which is secured to said cotter pin 6, and, i, is a hook secured to the other end of said coil spring 7.

In the accompanying drawings one runner only is shown but one or more runners may be used on one or both sides of the vehicle as desired. These runners are readily, easily and quickly attached to or detached from the wheels as follows. These runners are attached to any wheeled vehicle by first placing the wheels of the vehicle, to which they are to be attached, in the longitudinal grooves, a, and placing the front wheels in the upturned portion of the runner 1, which extends past their center, this grasps and holds the wheel while the coil spring 7 is expanded until the hook, i, passes over the hub of the wheel when the contraction of the coiled wire acting on the hub of the wheel securely binds and locks the whole together. And these wheels are readily, easily and quickly removed from the runners by simply expanding the coil wire 7.

While this invention has been described as applicable to baby carriages since the same is the most common use contemplated for same, it will also be evident that the same might be applied to larger vehicles of various kinds.

This device therefore provides a simple, light, strong and durable runner for this purpose and one not liable to get out of repair.

Having thus described our invention, we claim,

In a device of the class described, a runner formed with a longitudinal groove in its upper face turned up past the center at the front end and turned up slightly at the rear end, in combination with a semicircular plate concaved on the lower side which is secured to said runner, a cotter pin extending through and secured to said semicircular plate, a coil spring secured to said cotter pin, a hook secured to said coil spring and adapted to engage with the hub or hubs of a wheeled vehicle.

In testimony whereof, we have signed in the presence of the two undersigned witnesses.

ALFRED D. WESTMAN.
WILLIAM H. WESTMAN.
JAMES N. RICHARDS.

Witnesses:
ALFRED WILLARD,
BASIL A. HUBBARD.